United States Patent
Yang et al.

(10) Patent No.: US 9,065,645 B2
(45) Date of Patent: Jun. 23, 2015

(54) METHOD AND APPARATUS FOR PROVIDING ACKNOWLEDGEMENT INFORMATION TO RADIO COMMUNICATION DEVICES IN A WIRELESS COMMUNICATION SYSTEM

(71) Applicant: MOTOROLA SOLUTIONS, INC., Schaumburg, IL (US)

(72) Inventors: Yunhai Yang, Elgin, IL (US); Daniel J. McDonald, Cary, IL (US); Mark Shahaf, Vernon Hills, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 177 days.

(21) Appl. No.: 13/629,510

(22) Filed: Sep. 27, 2012

(65) Prior Publication Data

US 2014/0086216 A1    Mar. 27, 2014

(51) Int. Cl.
*H04L 1/16*    (2006.01)
*H04L 1/18*    (2006.01)

(52) U.S. Cl.
CPC ............ *H04L 1/1614* (2013.01); *H04L 1/1671* (2013.01); *H04L 1/1854* (2013.01); *H04L 1/1858* (2013.01); *H04L 1/1864* (2013.01)

(58) Field of Classification Search
CPC ............ H04L 27/2613; H04L 27/2662; H04L 27/2647; H04L 7/041; H04L 7/042; H04L 5/0053
USPC ......... 370/276, 277, 278, 280, 282, 294, 295, 370/310, 311, 312, 328, 458
See application file for complete search history.

(56) References Cited

U.S. PATENT DOCUMENTS

| | | | |
|---|---|---|---|
| 7,586,865 B2 * | 9/2009 | Ostman et al. | 370/318 |
| 7,849,376 B2 * | 12/2010 | Mate et al. | 714/748 |
| 8,121,082 B2 | 2/2012 | Pajukoski | |
| 8,160,002 B2 | 4/2012 | Rajkotia | |

(Continued)

FOREIGN PATENT DOCUMENTS

| | | |
|---|---|---|
| EP | 2330768 A1 | 6/2011 |
| WO | 2009099306 A1 | 8/2009 |
| WO | 2009100069 A3 | 11/2009 |

OTHER PUBLICATIONS

PCT International Search Report Dated Jan. 2, 2014 for Counterpart Application PCT/US2013/060446.

*Primary Examiner* — Curtis A Alia

(74) *Attorney, Agent, or Firm* — Daniel R. Bestor

(57) ABSTRACT

A method and apparatus for providing acknowledgment information for radio communication devices in a wireless communication system. A base station receives a plurality of units of data each respectively transmitted by one of a plurality of radio communication devices on one of a plurality of predetermined communication slot positions of a first channel. The base station, in response to receiving the data messages, sends a control message on a communication slot position of a second channel. The control message includes acknowledgment information having a plurality of positional acknowledgment indicators. Each radio communication device receives the control message and uses acknowledgment position mapping information to identify one or more positions within the plurality of positional acknowledgment indicators that contains an acknowledgment to the respective units of data it transmitted on the corresponding predetermined communication slot positions of the first channel.

13 Claims, 9 Drawing Sheets

(56) References Cited

U.S. PATENT DOCUMENTS

| | | |
|---|---|---|
| 2004/0109433 A1 | 6/2004 | Khan |
| 2006/0048034 A1* | 3/2006 | Cho .............................. 714/749 |
| 2008/0008126 A1* | 1/2008 | Shirakabe et al. ............ 370/329 |
| 2009/0279460 A1 | 11/2009 | Sarkar |
| 2011/0032925 A1* | 2/2011 | Lee et al. ...................... 370/345 |
| 2011/0268032 A1 | 11/2011 | Kim et al. |
| 2011/0317692 A1 | 12/2011 | Guttman et al. |
| 2012/0084618 A1 | 4/2012 | Chowdhury et al. |
| 2012/0087349 A1 | 4/2012 | Zhu |
| 2012/0113945 A1 | 5/2012 | Moon et al. |
| 2013/0242825 A1* | 9/2013 | Farhadi et al. ................ 370/311 |

\* cited by examiner

FIG. 7A

SUPER FRAME 1

| SLOT POSITION | 0 | 1 | 2 | 3 | 4 | 5 | 6 | 7 | 8 | 9 | 10 | 11 |
|---|---|---|---|---|---|---|---|---|---|---|---|---|
| OUTBOUND CHANNEL | 1ED0 | 1ED1 | 2 | 3 | 4 | 5 | 6 | 7 | 8 | 9 | S | S |
| INBOUND CHANNEL | 0 | 1 | 2 | 3 | 4 | 5 | 6 | 7 | 8 | 9 | 10 | 11 |
| SCHEDULING | | | | SAC0 | SAC1 | SAC2 | SAC3 | SAC4 | SAC5 | SAC6 | SAC7 | SAC8 |
| POSITIONAL ACK BITMAP | 2ED0(A14) | 2ED0(A15) | 2ED0(A16) | 2ED0(A17) | 2ED0(A18) | 2ED0(A19) | 2ED0(A20) | 2ED0(A21) | 2ED0(A22) | 2ED0(A23) | 4ED0(A0) | 4ED0(A1) |
| | 2ED1(A13) | 2ED1(A14) | 2ED1(A15) | 2ED1(A16) | 2ED1(A17) | 2ED1(A18) | 2ED1(A19) | 2ED1(A20) | 2ED1(A21) | 2ED1(A22) | 2ED1(A23) | 4ED1(A0) |
| | 3ED0(A2) | 3ED0(A3) | 3ED0(A4) | 3ED0(A5) | 3ED0(A6) | 3ED0(A7) | 3ED0(A8) | 3ED0(A9) | 3ED0(A10) | 3ED0(A11) | 3ED0(A12) | 3ED0(A13) |
| | 3ED1(A1) | 3ED1(A2) | 3ED1(A3) | 3ED1(A4) | 3ED1(A5) | 3ED1(A6) | 3ED1(A7) | 3ED1(A8) | 3ED1(A9) | 3ED1(A10) | 3ED1(A11) | 3ED1(A12) |

SUPER FRAME 2

| SLOT POSITION | 0 | 1 | 2 | 3 | 4 | 5 | 6 | 7 | 8 | 9 | 10 | 11 |
|---|---|---|---|---|---|---|---|---|---|---|---|---|
| OUTBOUND CHANNEL | 2ED0 | 2ED1 | 2 | 3 | 4 | 5 | 6 | 7 | 8 | 9 | S | S |
| INBOUND CHANNEL | 0 | 1 | 2 | 3 | 4 | 5 | 6 | 7 | 8 | 9 | 10 | 11 |
| SCHEDULING | SAC9 | SAC10 | SAC11 | SAC0 | SAC1 | SAC2 | SAC3 | SAC4 | SAC5 | SAC6 | SAC7 | SAC8 |
| POSITIONAL ACK BITMAP | 4ED0(A2) | 4ED0(A3) | 4ED0(A4) | 4ED0(A5) | 4ED0(A6) | 4ED0(A7) | 4ED0(A8) | 4ED0(A9) | 4ED0(A10) | 4ED0(A11) | 4ED0(A12) | 4ED0(A13) |
| | 4ED1(A1) | 4ED1(A2) | 4ED1(A3) | 4ED1(A4) | 4ED1(A5) | 4ED1(A6) | 4ED1(A7) | 4ED1(A8) | 4ED1(A9) | 4ED1(A10) | 4ED1(A11) | 4ED1(A12) |
| | 3ED0(A14) | 3ED0(A15) | 3ED0(A16) | 3ED0(A17) | 3ED0(A18) | 3ED0(A19) | 3ED0(A20) | 3ED0(A21) | 3ED0(A22) | 3ED0(A23) | | |
| | 3ED1(A13) | 3ED1(A14) | 3ED1(A15) | 3ED1(A16) | 3ED1(A17) | 3ED1(A18) | 3ED1(A19) | 3ED1(A20) | 3ED1(A21) | 3ED1(A22) | 3ED1(A23) | |

SUPER FRAME 3

| SLOT POSITION | 0 | 1 | 2 | 3 | 4 | 5 | 6 | 7 | 8 | 9 | 10 | 11 |
|---|---|---|---|---|---|---|---|---|---|---|---|---|
| OUTBOUND CHANNEL | 3ED0 | 3ED1 | 2 | 3 | 4 | 5 | 6 | 7 | 8 | 9 | S | S |
| INBOUND CHANNEL | 0 | 1 | 2 | 3 | 4 | 5 | 6 | 7 | 8 | 9 | 10 | 11 |
| SCHEDULING | SAC9 | SAC10 | SAC11 | SAC0 | SAC1 | SAC2 | SAC3 | SAC4 | SAC5 | SAC6 | SAC7 | SAC8 |
| POSITIONAL ACK BITMAP | 4ED0(A14) | 4ED0(A15) | 4ED0(A16) | 4ED0(A17) | 4ED0(A18) | 4ED0(A19) | 4ED0(A20) | 4ED0(A21) | 4ED0(A22) | 4ED0(A23) | | |
| | 4ED1(A13) | 4ED1(A14) | 4ED1(A15) | 4ED1(A16) | 4ED1(A17) | 4ED1(A18) | 4ED1(A19) | 4ED1(A20) | 4ED1(A21) | 4ED1(A22) | 4ED1(A23) | |

SUPER FRAME 4

| SLOT POSITION | 0 | 1 | 2 | 3 | 4 | 5 | 6 | 7 | 8 | 9 | 10 | 11 |
|---|---|---|---|---|---|---|---|---|---|---|---|---|
| OUTBOUND CHANNEL | 4ED0 | 4ED1 | 2 | 3 | 4 | 5 | 6 | 7 | 8 | 9 | S | S |
| INBOUND CHANNEL | 0 | 1 | 2 | 3 | 4 | 5 | 6 | 7 | 8 | 9 | 10 | 11 |
| SCHEDULING | SAC9 | SAC10 | SAC11 | SAC0 | SAC1 | SAC2 | SAC3 | SAC4 | SAC5 | SAC6 | SAC7 | SAC8 |
| POSITIONAL ACK BITMAP | | | | | | | | | | | | |

*FIG. 7B*

METHOD AND APPARATUS FOR PROVIDING ACKNOWLEDGEMENT INFORMATION TO RADIO COMMUNICATION DEVICES IN A WIRELESS COMMUNICATION SYSTEM

FIELD OF THE DISCLOSURE

The present disclosure relates generally to communication systems and more particularly to a method and apparatus for providing acknowledgment information to radio communication devices in wireless communication systems.

BACKGROUND

Wireless communication systems generally include a plurality of communication devices, such as mobile or portable radio devices that are located in multiple sites. Each site may include a set of base stations or repeaters for communicating information such as voice, data, control, and network management traffic between the communication devices and with each other. Such mobile or portable radio devices often need an explicit acknowledgment in order to know the success or failure of a data delivery. Many cellular systems include random access procedures that dictate an explicit acknowledgment as an individual message to the subscriber radio that initiated the request. Since the dominant service in cellular systems is telephony, the number of resources for user services becomes the capacity bottle neck as compared to control channel transactions. For dedicated land mobile radio (LMR) system, where the most dominant service is Push-to-Talk (PTT), the control channel on which the calls are being set up becomes a bottle neck.

Some LMR systems, such as Terrestrial Trunked Radio (TETRA) systems were based on cellular principles and accordingly their random access procedures are similar to cellular networks incorporating explicit acknowledgments. In order to handle the potential overload of the control channel, the TETRA standard suggests extending control channel capacity by adding secondary control channels. This method, however, results in increased utilization of resources for control rather than for user services, which is unacceptable in cases where the number of available physical resources is limited. In some systems, explicit acknowledgments are needed for both control channel transactions and data messages. In systems that incorporate slotted data architecture, the channel sends explicit acknowledgment to a subscriber for every scheduled data slot. Explicit acknowledgment requires a full outbound slot in order to contain the identifier of the subscriber radio requiring the acknowledgment as well as the actual acknowledgment information indicating the success or failure of the data delivery. This explicit acknowledgment consumes 17%-30% of outbound bandwidth depending on the data packet size, resulting in total bandwidth utilization ranging from 55% for packets with ten (10) scheduled data slots to 80% for packets with two (2) scheduled data slots.

Accordingly, there is a need for a solution that improves slotted data channel outbound efficiency.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 7A and 7B show a table illustrating an example communication scenario between a base station and multiple radio communication devices in accordance with an embodiment of the present disclosure.

Figure 1:
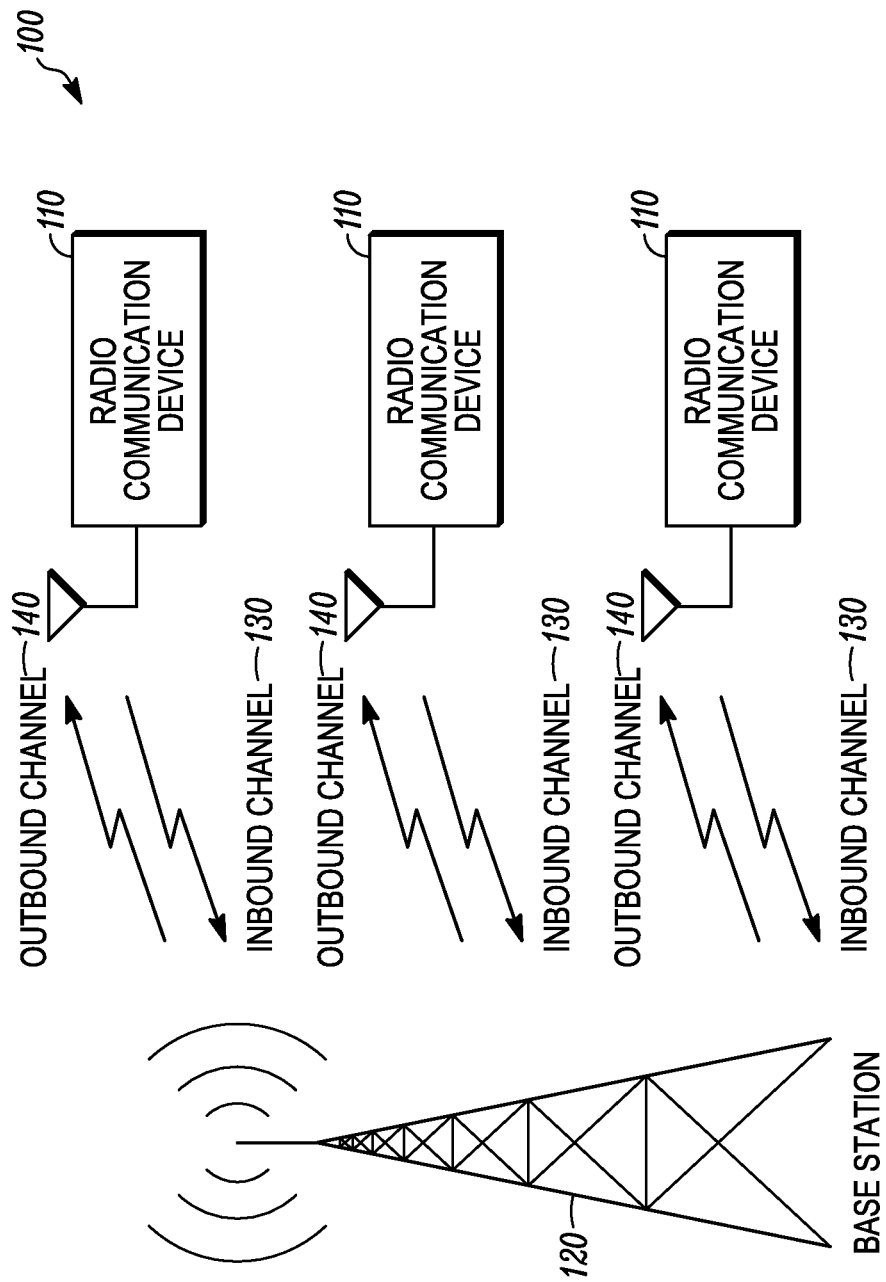
FIG. 1 is a block diagram of a wireless communication system in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

A method and apparatus for providing acknowledgment information for radio communication devices in a wireless communication system is provided herein. The wireless communication system includes a plurality of radio communication devices in communication with a base station. In operation, the base station receives a plurality of units of data, each unit of data respectively transmitted by one of a plurality of radio communication devices on one of a plurality of predetermined communication slot positions of a first channel. The base station, in response to receiving the plurality of units of data, generates a single control message to include acknowledgment information having a plurality of positional acknowledgment indicators. Each positional acknowledgment indicator respectively indicates an acknowledgment corresponding to the unit of data transmitted on a respective one of the plurality of predetermined communication slot positions of the first channel. The control message further includes an acknowledgment position mapping information that maps a position of each positional acknowledgment indicator within the acknowledgment information to a position of each predetermined communication slot position within the plurality of predetermined communication slot positions of the first channel. The base station then transmits the control message including both the acknowledgment information and acknowledgment position mapping information on at least one communication slot position of a second channel. Each radio communication device, after transmitting its one or more units of data respectively on one or more predetermined communication slot positions of the first channel, switches to the second channel to receive the control message. The radio communication device uses the acknowledgment position mapping information to identify one or more positions within the plurality of positional acknowledgment indicators that contains an acknowledgment indicating whether or not the one or more units of data transmitted respectively on one or more predetermined communication slot positions were successfully received.

FIG. 1 is a block diagram illustrating a wireless communication system 100 in accordance with an embodiment. The wireless communication system 100 comprises a plurality of radio communication devices 110 in communication with a base station 120. In one embodiment, the base station 120 may be replaced with any other suitable network infrastructure device that can receive information in a signal from a communication device and transmit information in signals to one or more communication devices via one or more wired or wireless communication links. Suitable network infrastructure devices include, but are not limited to, repeaters, access points, routers, servers, mobile stations, or other types of infrastructure equipment interfacing a wireless communication device or subscriber unit in a wireless environment. In one embodiment, the radio communication devices 110 include devices that are commonly referred to as access terminals, mobile radios, mobile stations, wireless communication devices, user equipment, mobile devices, or any other device capable of operating in a wireless environment. Examples of radio communication devices 110 include, but are not limited to, two-way radios, mobile phones, cellular phones, personal digital assistants, laptops, and pagers. Further, it is to be understood that the wireless communication system 100 is only a logical representation of connections between a number of radio communication devices 110 and a base station 120, and thus the wireless communication system 100 may otherwise include multiple base stations 120, each base station 120 serving different logical groups of radio communication devices 110 that are distributed among multiple sites.

In one embodiment, the wireless communication system 100 represents a two-way radio communication system where the radio communication devices 110 are subscribers of a particular talk group and communicate with each other through the base station 120 via one or more channels provided by radio links. The radio links provide an inbound channel 130 and an outbound channel 140 that comprise non-tangible communication resources, e.g., radio frequency (RF) resources, over which time division multiple access (TDMA) slots, or Code Division Multiple Access (CDMA) codes or orthogonal frequency division multiple access (OFDMA) sub-carriers, or any combination of the above may be implemented. The radio communication devices 110 transmit data messages on the inbound channel 130 and the base station 120 transmits control messages and/or data messages on the outbound channel 140. In one embodiment, the inbound channel 130 (also referred to as a first channel) operates in a first frequency range and the outbound channel 140 (also referred to as a second channel) operates in a second frequency range. In one embodiment, the inbound channel 130 may have a super frame structure having a predefined number of inbound communication slot positions, where each inbound communication slot position represents a TDMA slot, a CDMA code, or an OFDMA sub-carrier of a first carrier frequency. Similarly, the outbound channel 140 may gave a super frame structure having a predefined number of outbound communication slot positions, where each outbound communication slot position represents a TDMA slot, a CDMA code, or an OFDMA sub-carrier of a second carrier frequency. In accordance with embodiments of the present disclosure, the radio communication devices 110 operate in a time division duplex (TDD) mode in which the radio communication devices 110 toggle between transmission directions over designated time intervals. In one embodiment, the radio communication devices 110 switch to a first channel (inbound channel 130) for upstream transmissions, for example, to transmit data or control messages to other radio communication devices 110 and/or base station 120, and switch to a second channel (outbound channel 140) for downstream transmissions, for example to receive data and/or control messages from other radio communication devices 110 and/or base station 120. In embodiments of the present disclosure, each inbound communication slot position of the inbound channel 130 carries one unit of a particular data message transmitted by one or more radio communication devices 110. As used herein, a "data message" represents multiple units of data transmitted by one or more radio communication devices 110, where each unit of data is transmitted in a single inbound communication slot position. So, a plurality of inbound communication slot positions may be required for transmission of a single data message. In one embodiment, a radio communication device 110 fragments, as necessary, its data message into one or more units of data so that each scheduled inbound communication slot position is sufficient to carry an individual unit of data. Further, it is to be understood that the terms "inbound communication slot positions" and "outbound communication slot positions" are logical representations of any channel capacity that is capable of carrying units of data, irrespective of the multiple access schemes (TDMA slots, CDMA codes, or OFDMA sub-carriers or other multiple access schemes) over which the slot positions are implemented.

In embodiments of the present disclosure, the base station 120 uses positional acknowledgment indicators to provide acknowledgments for units of data received from one or more radio communication devices 110. The use of positional acknowledgment indicators in accordance with embodiments of the present disclosure eliminates the need for explicit acknowledgment messages that are used in existing systems for sending specific acknowledgments to each subscriber (radio communication device 110). The elimination of explicit acknowledgment messages also eliminates the need for a separate outbound communication slot for each specific acknowledgment. The following paragraph describes the explicit acknowledgment mechanisms used in existing conventional systems.

In existing systems, when a subscriber (e.g. radio communication device 110) has an inbound data message to send, the subscriber sends in a data request, for example, a random access-request (RA-Request) message using an available inbound communication slot position (referred to as RA-Slot) with information of how many inbound communication slot positions (also referred to as reserved slot, RS-Slot) it needs to send the entire data message. In response to this request, the base station (e.g. base station 120) sends an explicit acknowledgment (RA-ACK) to the subscriber to indicate that the RA-Request was successfully received. After receiving the RA-ACK message, the subscriber waits to receive the scheduling information (also referred to as RS-Scheduling) including the slots (RS-Slots) reserved for inbound data and proceeds to transmit the (perhaps fragmented) units of data associated with the data message in respective scheduled RS-slots. In existing systems, the base station after receiving the data in the scheduled RS-slots evaluates if an RS-slot transmission was successful or failed, and explicitly sends selective acknowledgment (RS-ACK) to the subscriber. Once the subscriber receives the RS-ACK, it waits for the next RS-scheduling and retransmits the data corresponding to the failed slot(s) along with any new data. One problem with the above existing process is that since the RA-Scheduling, RA-ACK, RS-Scheduling, and RS-ACK each need outbound channel bandwidth only for inbound data transfer purposes, the free available outbound bandwidth becomes more limited for actual outbound data and/or infrastructure signaling. An alternative approach, provided by embodiments of the present disclosure, eliminates the need for separate explicit acknowledgments through the use of positional acknowledgment indicators.

In accordance with embodiments of the present disclosure, the base station 120 includes the RS-ACK information in the existing RS-Scheduling slot instead of sending an explicit RS-ACK message that consumes outbound channel bandwidth. In the embodiments of the present disclosure, the radio communication devices 110 that have completed transmitting units of data on the inbound channel 130 will return to the outbound channel 140 and recover the next RS-Scheduling slot. Since each radio communication device 110 knows the exact location (inbound slot position) of where it transmitted its units of data, it can determine the success/failure of the previously transmitted data based on the positional acknowledgment indicators included in the RS-Scheduling slot of the outbound channel 140. In one embodiment, the RS-Scheduling slot also includes a Y-bit map to indicate the success/failure status of the RS-Slot transmission in the previous 'Y' inbound communication slot positions, where Y corresponds to the number of bits used for positional acknowledgment indicators. For example, in one communication system implementing slotted data architecture, the RS-Scheduling slot announces twelve (12) inbound slot reservations and further provides a 24-bit map for positional acknowledgment indicators that indicate acknowledgments corresponding to units of data that were transmitted on the previous twenty four (24) inbound communication slot positions. In one embodiment, the previous twenty four inbound communication slot positions, for which the positional acknowledgment indicators are included, may span two or more super frames depending on the size of a sliding window.

In accordance with embodiments of the present disclosure, the base station 120 receives a plurality of units of data, where each unit of data is respectively transmitted by one of a plurality of radio communication devices 110 on one of a plurality of predetermined inbound communication slot positions of the inbound channel 130. The base station 120 then generates a single control message to include acknowledgment information having a plurality of positional acknowledgment indicators, where each positional acknowledgment indicator respectively indicates an acknowledgment corresponding to the unit of data that was transmitted on a respective one of the plurality of predetermined inbound communication slot positions of the inbound channel 130. In one embodiment, the predetermined inbound communication slot positions refer to communication slot positions (RS-Slots) that are pre-scheduled (RS-Scheduling) by the base station 120 in response to data requests (RA-Requests) from respective radio communication devices 110. The base station 120 also further includes, in the same control message, acknowledgment position mapping information that maps a position of each positional acknowledgment indicator within the acknowledgment information to a position of each predetermined inbound communication slot position of the inbound channel. In one embodiment, the base station 120, instead of sending the acknowledgment information (having positional acknowledgment indicators) as a separate message, includes the acknowledgment information along with scheduling information (RS-Scheduling) in the same control message. As used herein, the term "scheduling information" refers to scheduling of inbound communication slot positions (RS-Slots) for one or more radio communication devices 110 from which either retransmission of one or more previous units of data are requested or new units of data are requested.

Each radio communication device 110, after transmitting its respective units of data on one or more of the predetermined inbound communication slot positions, switches to the outbound channel 140 and receives the control message including the positional acknowledgment indicators and acknowledgment position mapping information. Further, each radio communication device 110 uses the acknowledgment position mapping information to identify one or more positions within the plurality of positional acknowledgment indicators that contains an acknowledgment indicating whether or not a unit of data is successfully received in a corresponding predetermined inbound communication slot position. In accordance with embodiments of the present disclosure, the acknowledgment information included in the control message does not contain information other than the plurality of positional acknowledgment indicators. Also, the acknowledgment information does not contain a unique identifier for any of the radio communication devices to map one or more positional acknowledgment indicators to a particular radio communication device. The radio communication device 110 instead relies on the acknowledgment position mapping information for identifying the expected position(s) within the plurality of positional acknowledgment indicators that will contain the acknowledgment corresponding to the units of data it transmitted on the inbound channel 130. Therefore, the use of acknowledgment position mapping information advantageously eliminates the need for a separate acknowledgment message for each specific radio communication device 110.

Figure 2:
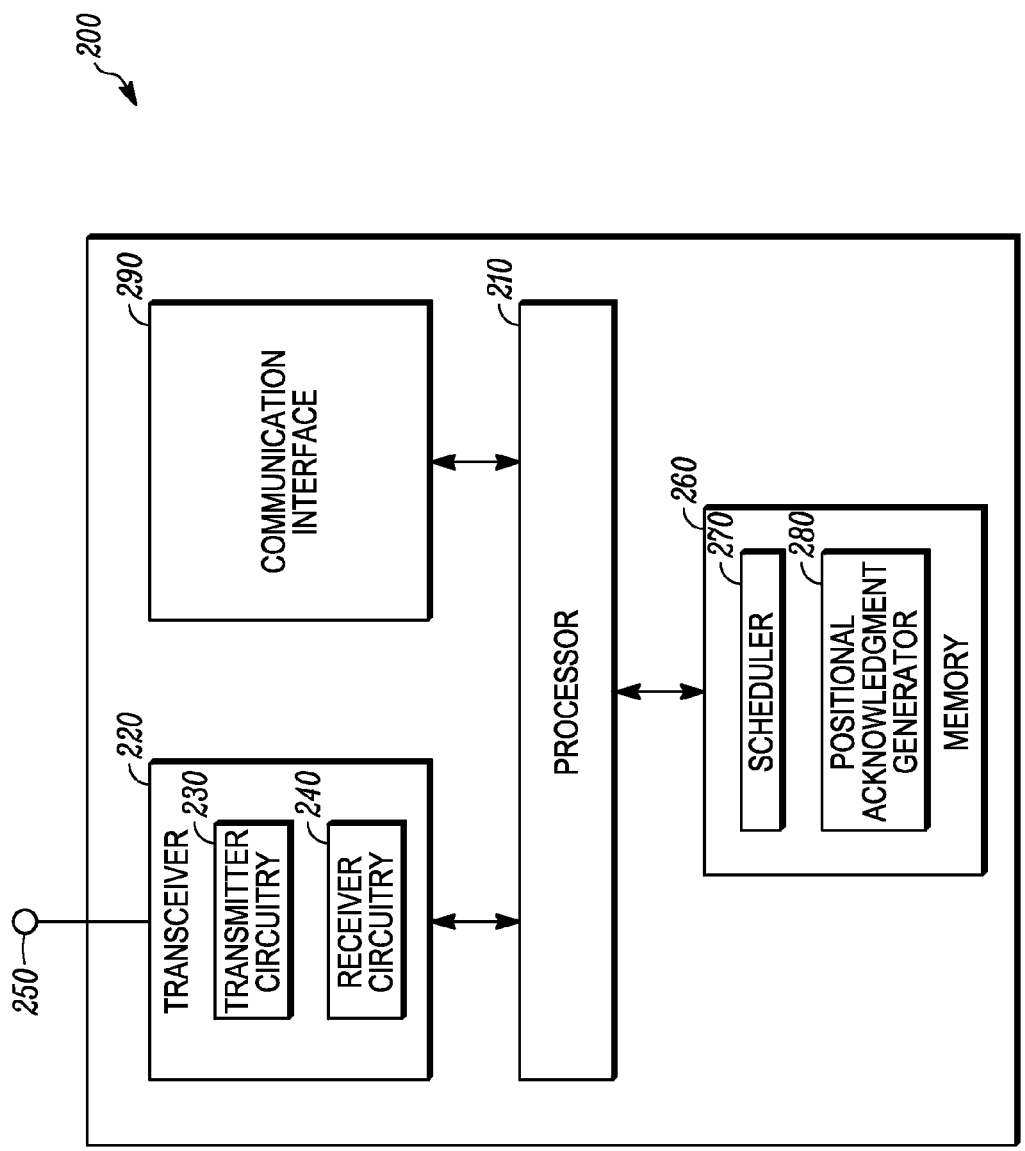
FIG. 2 is a block diagram of an apparatus that can be implemented, for example, in a base station in accordance with an embodiment of the present disclosure.

FIG. 2 is a block diagram of an apparatus 200 for operation within the wireless communication system 100 of FIG. 1 in accordance with some embodiments. The apparatus 200, for example, is implemented in a network infrastructure device or a control station for carrying out various functionalities that are necessary for providing acknowledgment information to radio communication devices 110 in the wireless communication system 100. In one embodiment, the apparatus 200 is implemented in a base station 120 to carry out the functions of a base station as well as the functions that are necessary for providing acknowledgment information to radio communication devices 110. The apparatus 200 includes a processor 210, a wireless transceiver 220 including a transmitter circuitry 230 and a receiver circuitry 240, an antenna 250, a memory 260 for storing operating instructions that are executed by the processor 210, and a communication interface 290. The apparatus 200 is an integrated unit containing at least all the elements depicted in FIG. 2, as well as any other elements necessary for the apparatus 200 for providing acknowledgment information to radio communication devices 110. Alternatively, the apparatus 200 can comprise a collection of appropriately interconnected units or devices, wherein such units or devices perform functions that are equivalent to the functions performed by the elements of the apparatus 200.

The processor 210 includes one or more microprocessors, microcontrollers, DSPs (digital signal processors), state machines, logic circuitry, or any other device or devices that process information based on operational or programming instructions. Such operational or programming instructions (not shown) are stored in the memory 260. The memory 260 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 210 has one or more of its functions performed by a state machine or logic circuitry, the memory 260 containing the corresponding operational instructions can be embedded within the state machine or logic circuitry.

The transmitter circuitry 230 and the receiver circuitry 240 enable the apparatus 200 to communicate radio signals to, and acquire radio signals from, radio communication devices 110. In this regard, the transmitter circuitry 230 and the receiver circuitry 240 include appropriate conventional circuitry to enable digital or analog transmissions over a wireless communication channel. The transmitter circuitry 230 and the receiver circuitry 240 are implemented as part of the wireless device hardware and software architecture in accordance with known techniques. One of ordinary skill in the art will recognize that most, if not all, of the functions of the transmitter circuitry 230 and/or the receiver circuitry 240 can be implemented in a processor, such as the processor 210.

The receiver circuitry 240 is capable of receiving RF signals from at least one frequency band and optionally multiple frequency bands. The transmitter circuitry 230 and the receiver circuitry 240 together form the wireless transceiver 220 to enable bi-directional wireless communication with other devices. In accordance with embodiments of the present disclosure, the wireless transceiver is configured to simultaneously operate on both the first channel (inbound channel 130) and the second channel (outbound channel 140), so that the apparatus 200 is able to receive data messages from radio communication devices on the inbound channel 130 while being able to transmit control/data messages on the outbound channel 140. The antenna 250 comprises any known or developed structure for radiating and receiving electromagnetic energy in the frequency ranges over which the transmitter circuitry 230 and the receiver circuitry 240 use to communicate. The communication interface 290 includes appropriate hardware and software architecture in accordance with known techniques that enable communication with the radio communication devices 110. In accordance with some embodiments, the communication interface 290 is implemented as a wireless interface for communication with the radio communication devices 110 and as a wired interface for communication with an application server/console (not shown).

As illustrated in FIG. 2, the memory 260 comprises a scheduler 270 that includes appropriate instructions that are executed by the processor to enable, for example, a base station 120 to perform scheduling functions for radio communication devices 110. In one embodiment, when the base station 120 receives a data request (RA-request), the scheduler 270 determines available inbound communication slot positions and allocates one or more inbound communication slot positions (RS-Slots) depending on the number of slot positions required for inbound data transmissions from the requesting radio communication devices. In another case, when the base station 120 determines that one or more units of data are not successfully received, the scheduler 270 allocates inbound communication slots positions for selective units of data corresponding to the data message that are not successfully received. In one embodiment, the scheduler 270 further includes the scheduling information identifying the allocated inbound communication slot positions in a control message for transmission on the outbound channel 140 that further includes acknowledgment information having a plurality of positional acknowledgment indicators.

The memory 260 further includes a positional acknowledgment generator 280 that includes appropriate instructions that are executed by the processor 210 to enable, for example, a base station 120 to generate positional acknowledgment indicators. The base station 120 monitors the inbound channel 130 for upstream transmissions from radio communication devices 110 and determines whether data transmissions, i.e., units of data corresponding to each inbound communication slot position, were successfully received or not. Further, the base station 120 enables the positional acknowledgment generator 280 to generate positional acknowledgment indicators for units of data corresponding to inbound communication slot positions. The positional acknowledgment indicator for a particular inbound communication slot position indicates whether or not the unit of data transmitted on the particular inbound communication slot position was successfully received by the base station 120. In accordance with embodiments of the present disclosure, the positional acknowledgment generator 280 generates positional acknowledgment indicators without specifying or identifying the radio communication device that actually transmitted the unit of data. In one embodiment, each positional acknowledgment indicator is represented by one bit of data to acknowledge whether or not a corresponding unit of data was successfully received in a corresponding inbound communication slot position. For example, the one bit of data in a particular positional acknowledgment indicator is set to '1' to indicate 'ACK', i.e., to represent that the unit of data was successfully received on the corresponding inbound communication slot position. Otherwise, the one bit of data is set to '0' in the particular positional acknowledgment indicator to indicate 'NACK', i.e., to represent that the unit of data was not successfully received on the corresponding inbound communication slot position. Once the positional acknowledgment indicators are generated by the positional acknowledgment generator 280 for the plurality of predetermined inbound communication slot positions, the base station 120 includes the generated positional acknowledgment indicators as acknowledgment information in a single control message. Further, the base station 120 uses one or more available outbound communication slot positions on the outbound channel 140 to transmit this control message including the acknowledgment information.

The memory 260 may also optionally store acknowledgment position mapping information (not shown) that maps a position of each positional acknowledgment indicator within the acknowledgment information to a position of each predetermined inbound communication slot position within the plurality of predetermined inbound communication slot positions of the inbound channel 130. The apparatus 200 further causes the wireless transceiver 220 to transmit the control message including both the acknowledgment information and acknowledgment position mapping information on at least one outbound communication slot position.

Figure 3:
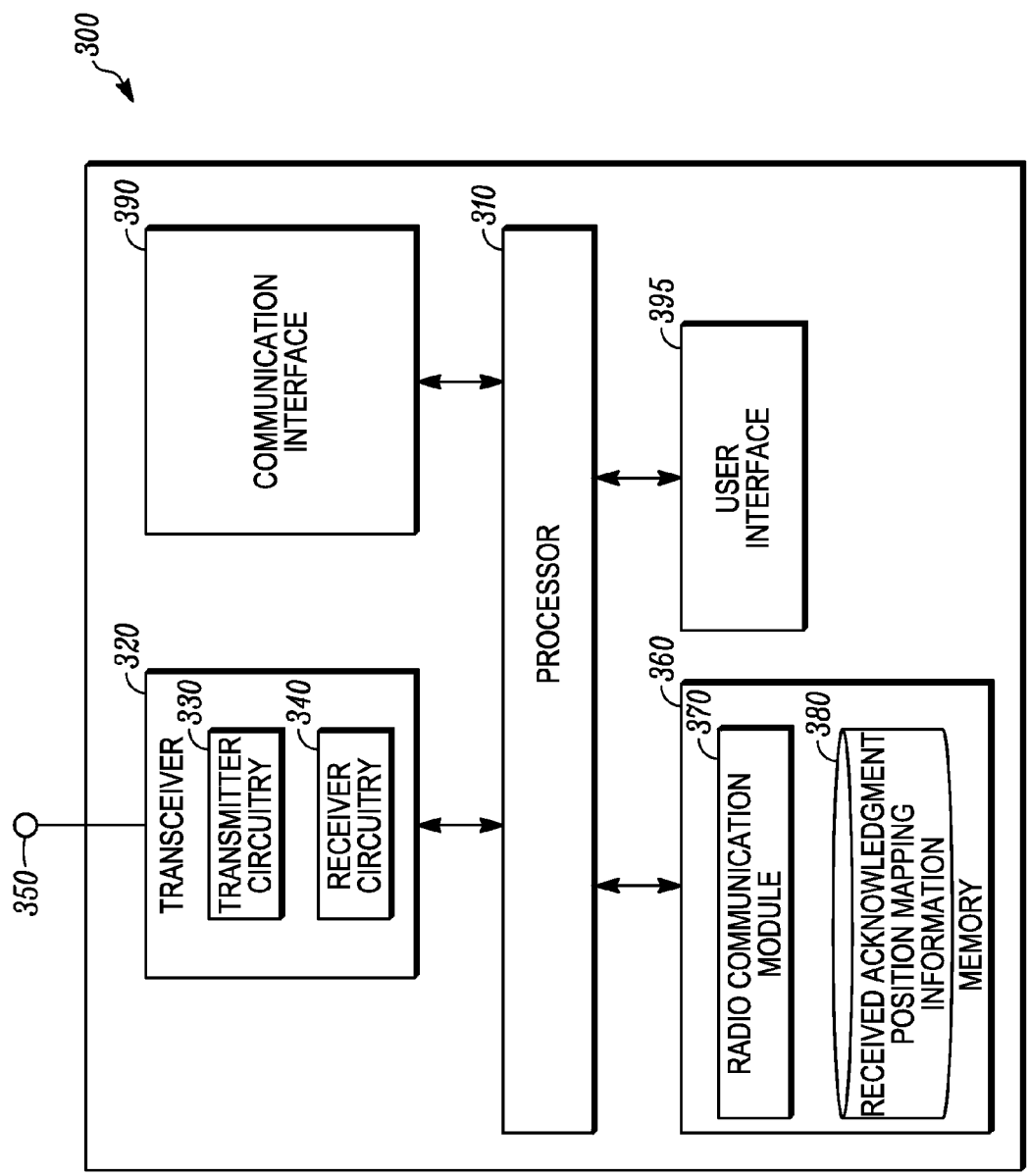
FIG. 3 is a block diagram of an apparatus that can be implemented, for example, in a radio communication device in accordance with an embodiment of the present disclosure.

FIG. 3 is a block diagram of an apparatus 300 for operation within the wireless communication system 100 of FIG. 1 in accordance with some embodiments. The apparatus 300, for example, is implemented in subscriber devices for carrying out various functionalities that are necessary for receiving acknowledgment information from the apparatus 200 implemented, for example in base station 120. In one embodiment, the apparatus 300 is implemented in a radio communication device 110 to enable the radio communication device 110 to transmit data messages as units of data and receive acknowledgment information from the base station 120 that contains an acknowledgment to each unit of data. The apparatus 300 includes a processor 310, a transceiver 320 including a transmitter circuitry 330 and a receiver circuitry 340, an antenna 350, a memory 360 for storing operating instructions including a radio communication module 370 and received acknowledgment position mapping information 380, a communication interface 390, and a user interface 395.

The processor 310 includes one or more microprocessors, microcontrollers, DSPs, state machines, logic circuitry, or any other device or devices that process information based on operational or programming instructions. Such operational or programming instructions (not shown) are stored in the memory 360. The memory 360 can be an IC memory chip containing any form of RAM, a floppy disk, a CD-RW, a hard disk drive, a DVD-RW, a flash memory card, external SIM card or any other medium for storing digital information. One of ordinary skill in the art will recognize that when the processor 310 has one or more of its functions performed by a state machine or logic circuitry, the memory 360 containing the corresponding operational instructions can be embedded within the state machine or logic circuitry.

The transmitter circuitry 330 and the receiver circuitry 340 enable the apparatus 300 to communicate radio signals to, and acquire radio signals from, the apparatus 200. In this regard, the transmitter circuitry 330 and the receiver circuitry 340 include appropriate conventional circuitry to enable digital or analog transmissions over a wireless communication channel. The transmitter circuitry 330 and the receiver circuitry 340 are implemented as part of a wireless device hardware and software architecture in accordance with known techniques. One of ordinary skill in the art will recognize that most, if not all, of the functions of the transmitter circuitry 330 and/or the receiver circuitry 340 can be implemented in a processor, such as the processor 310.

The receiver circuitry 340 is capable of receiving RF signals from at least one frequency band and optionally multiple frequency bands. The antenna 350 comprises any known or developed structure for radiating and receiving electromagnetic energy in the frequency range containing the wireless carrier frequencies. The communication interface 390 includes appropriate hardware and software architecture in accordance with known techniques that enable communication with the apparatus 200. In accordance with some embodiments, the communication interface 390 is implemented as a wireless interface for communication with base station 120.

The user interface 395 can include both input and output components. The user interface 395 may include an audio input component such as a microphone, and mechanical input components such as buttons or key selection sensors, touch pad sensors, touch screen sensors, capacitive sensors, motion sensors, and switches. Likewise, the output component of the user interface 395 may include a variety of video display, audio, and/or mechanical outputs. Other examples of output components include an audio output component such as a speaker, alarm and/or buzzer, and/or a mechanical output component such as vibrating or motion-based mechanisms.

As illustrated in FIG. 3, the memory 360 further comprises a radio communication module 370 that includes appropriate instructions that are executed by the processor 310 for performing the basic functions of a radio communication device 110 including enabling the transceiver 320 to transmit/receive data messages as units of data and receive acknowledgment information from the base station 120 that contains an acknowledgment to each unit of data. The memory 360 further stores acknowledgment position mapping information 380 that maps a position of each positional acknowledgment indicator within the acknowledgment information to a position of each predetermined inbound communication slot position within the plurality of predetermined inbound communication slot positions of the inbound channel 130. In one embodiment, the acknowledgment position mapping information 380 is received in a control message that is transmitted on an outbound channel 140. In an alternative embodiment, the acknowledgment position mapping information 380 can also be directly provisioned within the apparatus 300. The radio communication devices 110 use the acknowledgment position mapping information 380 to identify an expected position within the plurality of positional acknowledgment indicators that contains an acknowledgment on whether or not a corresponding unit of data was successfully received in a corresponding predetermined inbound communication slot position.

Figure 4:
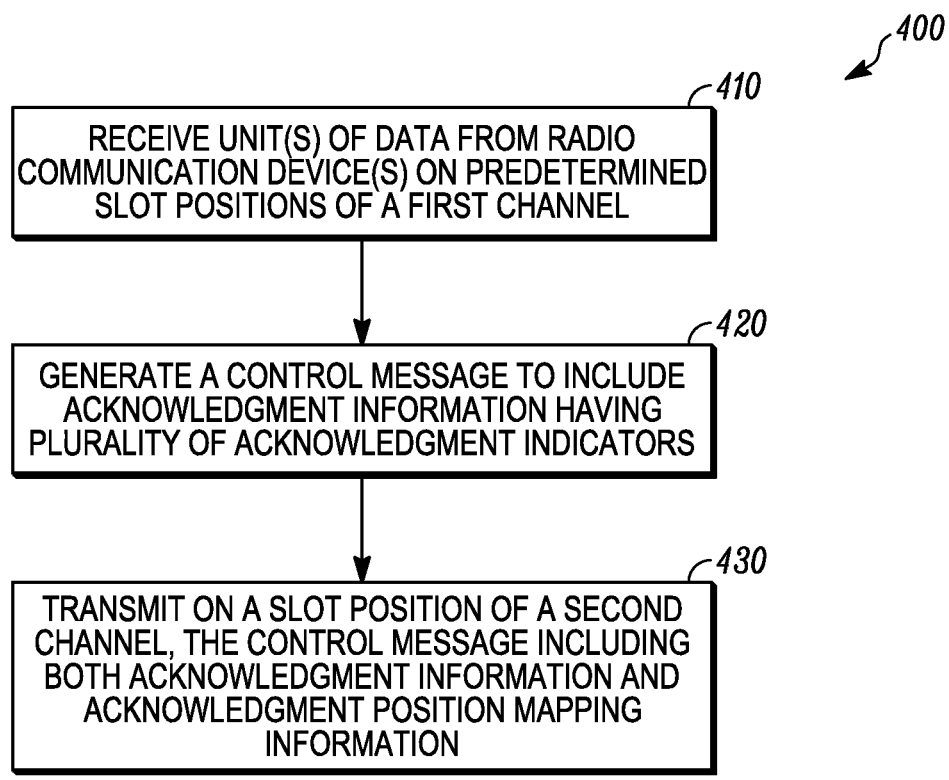
FIG. 4 is a flowchart illustrating a method of operation by an apparatus of FIG. 2 for providing acknowledgment information to a plurality of radio communication devices in accordance with an embodiment of the present disclosure.

FIG. 4 is a flowchart illustrating a method 400 of operation by an apparatus, such as the apparatus 200, that may be implemented, for example, in a base station such as base station 120 for providing acknowledgment information to a plurality of radio communication devices such as radio communication devices 110 in a wireless communication system in accordance with an embodiment of the present disclosure. At block 410, the apparatus receives a plurality of units of data each unit of data respectively transmitted by one of a plurality of radio communication devices on one of a plurality of predetermined communication slot positions of a first channel. In one embodiment, the predetermined communication slot position on the first channel refers to a slot position (RS-Slot) in an inbound channel such as inbound channel 130 that was previously scheduled by the apparatus in response to a data request from the radio communication device. In one example, the plurality of units of data may represent a data message received from a single radio communication device that used all of the plurality of the predetermined communication slot positions in the first channel to transmit the data message as units of data. In another example, the plurality of units of data may represent a data message received from multiple radio communication devices, where each radio communication device used one or more of the plurality of predetermined communication slot positions in the first channel to transmit its respective units of data. In accordance with embodiments of the present disclosure, for the purposes of generating positional acknowledgment indicators, the apparatus processes the received units of data in terms of the inbound communication slot positions in which the units of data are received and not based on which radio communication device specifically transmitted a particular unit of data.

Next, at block 420, the apparatus generates a single control message to include acknowledgment information and acknowledgment position mapping information. The acknowledgment information includes a plurality of positional acknowledgment indicators. In accordance with embodiments of the present disclosure, each acknowledgment indicator respectively indicates an acknowledgment corresponding to the unit of data that is transmitted on a respective one of the plurality of predetermined communication slot positions of the first channel. In one embodiment, each positional acknowledgment indicator is represented by one bit of data to acknowledge whether or not a unit of data was successfully received in a corresponding inbound communication slot position. For example, the one bit of data in the positional acknowledgment indicator is set to '1' to indicate 'ACK', i.e., to represent that the unit of data was successfully received on the corresponding inbound communication slot position. Otherwise, the one bit of data is set to '0' in the positional acknowledgment indicator to indicate 'NACK', i.e., to represent that the unit of data was not successfully received on the corresponding inbound slot position. In accordance with embodiments of the present disclosure, the acknowledgment information does not contain information other than the plurality of positional acknowledgment indicators. Also, the acknowledgment information does not contain a unique identifier for any of the plurality of radio communication devices to map one or more positional acknowledgment indicators to a particular radio communication device.

At block 430, the apparatus transmits on at least one communication slot position of a second channel, a generated control message including both the acknowledgment information and the acknowledgment position mapping information. The at least one communication slot position may refer to an outbound communication slot position on the outbound channel. In one embodiment, the apparatus further includes in the control message, scheduling information for one or more radio communication devices from which either retransmission of one or more previously transmitted units of data are requested or new units of data are requested. As used herein, the term "previously transmitted units of data" represents one or more units of data that was transmitted to the base station and further for which the base station has provided an acknowledgment indicating 'NACK' and also allocated RS-Slots in the inbound channel for retransmission. The term "new units of data" represents one or more units of data for which the base station has allocated RS-Slots in the inbound channel in response to a data request from a radio communication device.

In accordance with embodiments of the present disclosure, the apparatus periodically transmits the acknowledgment information having a plurality of acknowledgment indicators on at least one communication slot position of the second channel a predetermined number of times. In one embodiment, an acknowledgment to every unit of data is repeated a number of times depending on the size of a sliding window. The use of a sliding window also varies the positions of acknowledgments within the positional acknowledgment indicators in subsequent transmissions of the control message. In other words, for the same unit of data, the acknowledgment is carried in a different positional acknowledgment indicator in acknowledgment information carried in a second control message as compared to the position of the acknowledgment in the acknowledgment information carried in a first control message that was transmitted prior to the second control message. This repetition of acknowledgment for each unit of data a number of times increases the probability of a radio communication device receiving an acknowledgment from the base station for a particular unit of data. In some communication systems, radio communication devices require a certain time period to switch from one channel to another channel, for example, to switch from the inbound channel to receive transmissions on the outbound channel. In such cases, some radio communication devices may not receive the acknowledgment transmitted on an outbound communication slot position of a current super frame. To ensure that such radio communication devices also receive their acknowledgment, one embodiment of the present disclosure provides for repetition of the acknowledgment to every unit of data, for example, on subsequent super frames of the outbound channel to increase the outbound reliability.

Figure 5:
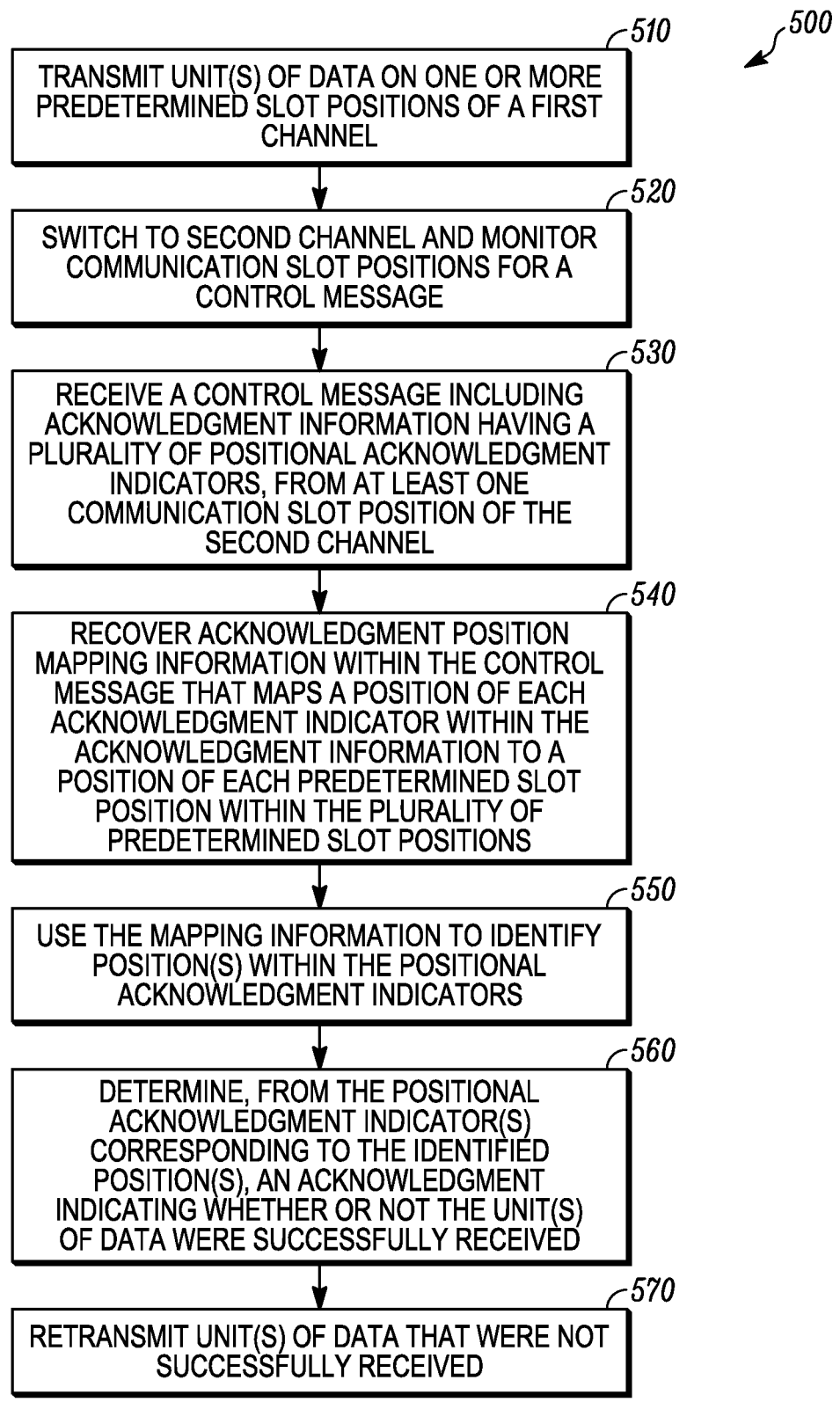
FIG. 5 is a flowchart illustrating a method of operation by a radio communication device of FIG. 3 for recovering acknowledgment information in accordance with an embodiment of the present disclosure.

FIG. 5 is a flowchart illustrating a method 500 of operation by an apparatus, such as apparatus 300 that is implemented, for example, in a radio communication device such as radio communication device 110 for recovering acknowledgment information in a wireless communication system in accordance with an embodiment of the present disclosure. At block 510, the radio communication device transmits one or more units of data respectively on one or more predetermined slot positions of a first channel. In one embodiment, the predetermined communication slot position refers to a slot position (RS-Slot) on an inbound channel that was previously scheduled by the apparatus in response to a data request (RA-Request) from the radio communication device. In this case, the radio communication device follows a random access procedure to determine a random access slot (RA-slot) on the inbound channel that can be used to transmit the data request. In one embodiment, the radio communication devices can transmit inbound data only on the RS-Slot. The data request (RA-request) transmitted by the radio communication device on the RA-Slot also includes information about the number of RS-Slots that are required to send the entire data message or packet. In response to this data request (RA-request), the radio communication device receives an explicit acknowledgment (RA-ACK) to indicate successful receiving of the RA-Request. After receiving the RA-ACK, the radio communication device switches to a second channel (such as, for example, outbound channel 140) and waits to receive the scheduling information (RS-Scheduling) at periodical intervals, for example, at a periodical boundary representing one super frame. When the radio communication device receives the scheduling information identifying the RS-slots for its inbound transmission, the radio communication device switches back to the inbound channel and transmits its data message (perhaps as fragmented units of data) in one or more scheduled RS-Slot(s) of the inbound channel. In this case, the radio communication device uses each scheduled RS-Slot to transmit one unit of data.

Next, at block 520, the radio communication device switches to the second channel and monitors communication slot positions on the second channel for a control message. For example, the radio communication device monitors the outbound communication slot positions on an outbound channel such as the outbound channel 140. At block 530, the radio communication device identifies at least one communication slot position to receive a control message including acknowledgment information having a plurality of positional acknowledgment indicators. Each positional acknowledgment indicator respectively indicates an acknowledgment corresponding to the unit of data transmitted on a respective one of the plurality of predetermined communication slot positions of the first channel (for example, the inbound channel 130). Further, at block 540, the radio communication device recovers acknowledgment position mapping information from within the control message. In one embodiment, the acknowledgment position mapping information contains information from which radio communication devices can derive further information that maps a position of each positional acknowledgment indicator within the acknowledgment information to a position of each predetermined inbound communication slot position within the plurality of predetermined inbound communication slot positions. The acknowledgment position mapping information includes information that enables the radio communication device to identify one or more positions within the plurality of positional acknowledgment indicators that contains the acknowledgment to the units of data it previously transmitted on the inbound channel. Since each inbound communication slot position on which a particular unit of data was previously transmitted is already mapped to a particular positional acknowledgment indicator and further the radio communication device already knows the inbound communication slot position on which it transmitted its previous units of data, it is possible for the radio communication device to identify position(s) within the plurality of acknowledgment indicators that contains acknowledgment(s) corresponding to its previously transmitted units of data. In accordance with embodiments of the present disclosure, the radio communication device is able to identify the position within the positional acknowledgment indicators without relying on any additional information such as unique identifiers that explicitly associate an acknowledgment to a particular radio communication device. The elimination of explicit association of acknowledgment to radio communication devices advantageously provides for additional bandwidth in the outbound channel that can used for other purposes such as outbound voice, data, and/or control signaling.

At block 550, the radio communication device uses the acknowledgment position information to identify one or more positions within the plurality of positional acknowledgment indicators. Further, at block 560, the radio communication device determines, from one or more positional acknowledgment indicators corresponding to the one or more identified positions, an acknowledgment indicating whether or not the one or more units of data transmitted respectively on one or more of the predetermined communication slot positions of the first channel was successfully received. In one embodiment, each positional acknowledgment indicator carries one bit of data to represent an acknowledgment indicating whether or not the unit of data transmitted on a corresponding predetermined communication slot position was successfully received by the base station. For example, if the one bit of data corresponding to the determined one or more positional acknowledgment indicators is set to '1', then the radio communication device determines that the one or more units of data was successfully received on the corresponding communication slot positions. Otherwise, if the determined one or more positional acknowledgment indicators is set to '0' bit, then the radio communication device determines that the one or more units of data transmitted respectively on one or more predetermined communication slot positions was not successfully received. In case the radio communication device determines from the one or more determined positional acknowledgment indicators that the one or more units of data was not successfully received by the base station, the radio communication device retransmits the one or more units of data on one or more predetermined communication slot positions as shown in block 570. In accordance with embodiments of the present disclosure, the radio communication device selectively retransmits only those units of data which are determined to have not been successfully received by the base station.

Figure 6:
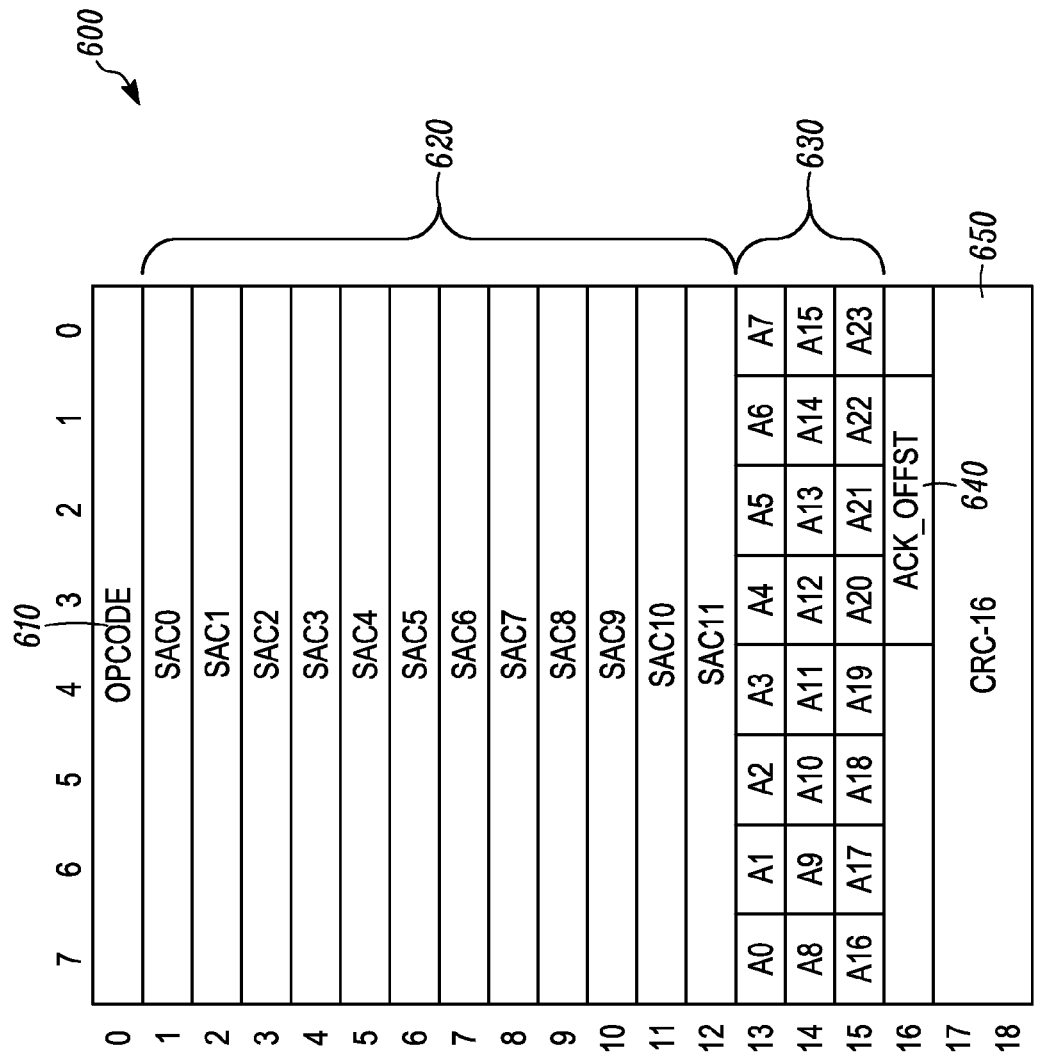
FIG. 6 illustrates a structure of a control message that may be used to provide acknowledgment information to radio communication devices in accordance with an embodiment of the present disclosure.

FIG. 6 illustrates a structure of a control message 600 that may be used to provide acknowledgment information to radio communication devices such as radio communication devices 110 in accordance with one embodiment of the present disclosure. The control message 600 can be used in wireless communication systems implementing enhanced slotted data architecture in accordance with embodiments of the present disclosure. In such systems, the control message 600 is also referred to as an enhanced data control message (ED-Control Message). As shown in FIG. 6, the control message 600 comprises at least '19' octets of digital information. The first octet of the control message is reserved for opcode information 610. In the control message 600, twelve octets (1-12$^{th}$ Octets) are reserved for scheduling information field 620 that is used to contain scheduling information for one or more radio communication devices from which either retransmission of previous units of data are requested or new units of data are requested. Each scheduling information field 620 includes a subscriber access code (SAC) that logically identifies the radio communication device that is scheduled to transmit in the corresponding inbound communication slot position. The scheduling information field 620 comprises twelve (12) fields each mapped to one of the inbound communication slot position and depending on the subscriber access code contained in a particular field, a radio communication device can determine the inbound communication slot positions (RS-Slot) that are scheduled for its inbound data transmission.

The control message 600 further includes acknowledgment information field 630 that can contain twenty-four (24) positional acknowledgment indicators (A0-A23). The Octets '13' through '15' contain the '24' positional acknowledgment indicators. Each of the '24' positional acknowledgment indicators is respectively used to indicate an acknowledgment corresponding to units of data respectively received on each of the '24' inbound communication slot positions of an inbound channel such as the inbound channel 130. The 'ACK_OFFST' field 640 provides information for radio communication devices on how to locate a position within the plurality of positional acknowledgment indicators that includes an acknowledgment corresponding to the units of data it transmitted on the inbound channel. In one embodiment, the 'ACK_OFFST' field 640 provides acknowledgment position mapping information that maps a position of each positional acknowledgment indicator within the acknowledgment information to a position of each predetermined inbound communication slot position within the plurality of predetermined inbound communication slot positions of the inbound channel. In one embodiment, the 'ACK_OFFST" field 640 provides a starting position of a sliding window in reference to when the acknowledgment information including the plurality of positional acknowledgment indicators are transmitted. The control message 600 further includes a 'CRC-16' field 650 in Octets '17' and '18' that provides information for error detection and/or correction.

FIGS. 7A and 7B show an example table 700 illustrating a communication scenario between a base station, such as base station 120, and multiple radio communication devices such as radio communication devices 110 in a wireless communication system in accordance with an embodiment of the present disclosure. In this example, the wireless communication system implements an architecture that provides an inbound channel such as inbound channel 130 having a super frame structure that repeats for every twelve (12) inbound communication slot positions and an outbound channel such as outbound channel 140 having a super frame structure that repeats for every twelve (12) outbound communication slot positions. The table 700 illustrates how each positional acknowledgment indicator received on a particular outbound communication slot position maps to a respective unit of data that was scheduled and transmitted on a particular inbound communication slot position for four (4) super frames, shown as super frames '1' through '4'. In FIGS. 7A and 7B, the table 700 includes a slot position field 710, an outbound channel field 720, an inbound channel field 730, a scheduling field 740, and a positional ACK bitmap field 750. The slot position field 710 represents the twelve (12) slot positions (slot positions '0' through '11') corresponding to inbound communication slot positions and outbound communication slot positions. The outbound channel field 720 represents the messages transmitted on the corresponding outbound communication slot positions. In the outbound channel field 720, the control messages transmitted on the outbound channel are represented as an 'ED' message and the units of data transmitted on the outbound channel are represented in terms of the slot positions. In the embodiment shown in FIGS. 7A and 7B, the outbound communication slot positions corresponding to slot position '0' and '1' are used to communicate a control message, such as the control message 600, in all four super frames, i.e., super frames '1' through '4'. In this embodiment, the fixed slot positions '0' and '1' are used to communicate the control message. Further, to differentiate the channel messages transmitted on different super frames '1' through '4', the channel messages in slot positions '0' and '1' of the outbound channel in super frame '1' are represented as '1ED0' and '1ED1', respectively. Similarly, the channel messages in slot positions '0' and '1' of the outbound channel in super frame '2' are represented as '2ED0' and '2ED1', respectively, and the channel messages in slot positions '0' and '1' in super frame '3' are represented as '3ED0' and '3ED1', respectively. For super frame '4', the channel messages corresponding to slot positions '0' and '1' are represented as '4ED0' and '4ED1', respectively.

The inbound channel field 730 represents the units of data transmitted on the corresponding inbound communication slot positions in terms of the slot positions. The scheduling field 740 identifies subscriber access codes (SAC0-SAC11) that are scheduled to transmit on the respective inbound communication slot positions. The positional ACK bitmap field 750 represents the location of the acknowledgment information corresponding to the unit of data transmitted on each inbound communication slot position. In particular, the positional ACK bitmap field 750 identifies a particular positional acknowledgment indicator within the '24' positional acknowledgment indicators that contains an acknowledgment to the unit of data transmitted on a particular inbound communication slot position. For a better understanding, the table 700 also uniquely identifies a particular channel message that contains the positional acknowledgment indicator corresponding to the each inbound data message. In the example shown in FIGS. 7A and 7B, the acknowledgment to each unit of data is repeated for four (4) times to ensure that all radio communication devices receive the acknowledgment information including those radio communication devices that take a certain time interval to switch to the outbound channel. In the table 700, the positional ACK bitmap field 750 provides four rows of information in order to represent the locations of the acknowledgment corresponding to each unit of data. The successive acknowledgment to same unit of data may be contained in different positional acknowledgment indicators as compared to the initially transmitted acknowledgment information.

For example, as shown in FIG. 7A, the location of the initially transmitted acknowledgment information corresponding to the unit of data transmitted on inbound communication slot position '0' of super frame '1' is shown as '2ED0 (A14)'. This means that the acknowledgment to unit of data transmitted on inbound communication slot position '0' of super frame '1' will be contained in a $15^{th}$ position (i.e. A14) among the '24' positional acknowledgment indicators that was transmitted on a control message in outbound communication slot position '0' of super frame '2' (i.e. 2ED0). Further, the locations (positions) of the successive acknowledgment indications to the same unit of data transmitted on slot position '0' of super frame '1' are shown as '2ED1(A13)', '3ED0 (A2)', and '3ED1(A1)'. The above locations show that the acknowledgment to the same unit of data are present in different positions (i.e. A14, A13, A2, A1) among the '24' positional acknowledgment indicators. This variation in the position of the positional acknowledgment indicators is due to the use of a sliding window concept, where each acknowledgment information containing the '24' positional acknowledgment indicators indicates acknowledgment for units of data transmitted on the previous '24' inbound communication slot positions. For example, in the table 700, the location of the initial positional acknowledgment indicator corresponding to an unit of data transmitted on inbound slot position '1' of super frame '1' is represented as '2ED0(A15)'. This means that the acknowledgment is contained in the $16^{th}$ position (A15) among the '24' positional acknowledgment indicators as compared to the $15^{th}$ position in the same channel message '2ED0' that was used for indicating acknowledgment for unit of data transmitted on the inbound slot position '0' of super frame '1'. This illustrates the fact that the window slides to a next positional acknowledgment indicator to indicate acknowledgment as the unit of data corresponds to a next inbound communication slot position. In a similar manner, as shown in FIGS. 7A and 7B, the positional ACK bitmap field 750 shows the derived locations of the positional acknowledgment indicators that indicate acknowledgment corresponding to units of data transmitted on inbound communication slot positions of super frames '2', '3', and '4'. In accordance with embodiments of the present disclosure, the radio communication devices can derive the expected positional acknowledgment indicator (from among multiple positional acknowledgment indicators) that will contain the acknowledgment corresponding to its units of inbound data from the acknowledgment position mapping information. In one embodiment, as shown in FIGS. 7A and 7B, the radio communication devices derive the locations contained in the positional ACK bitmap field 750 by using information contained in the control message, such as the ACK_OFFST field 640 of the control message 600.

Figure 8:
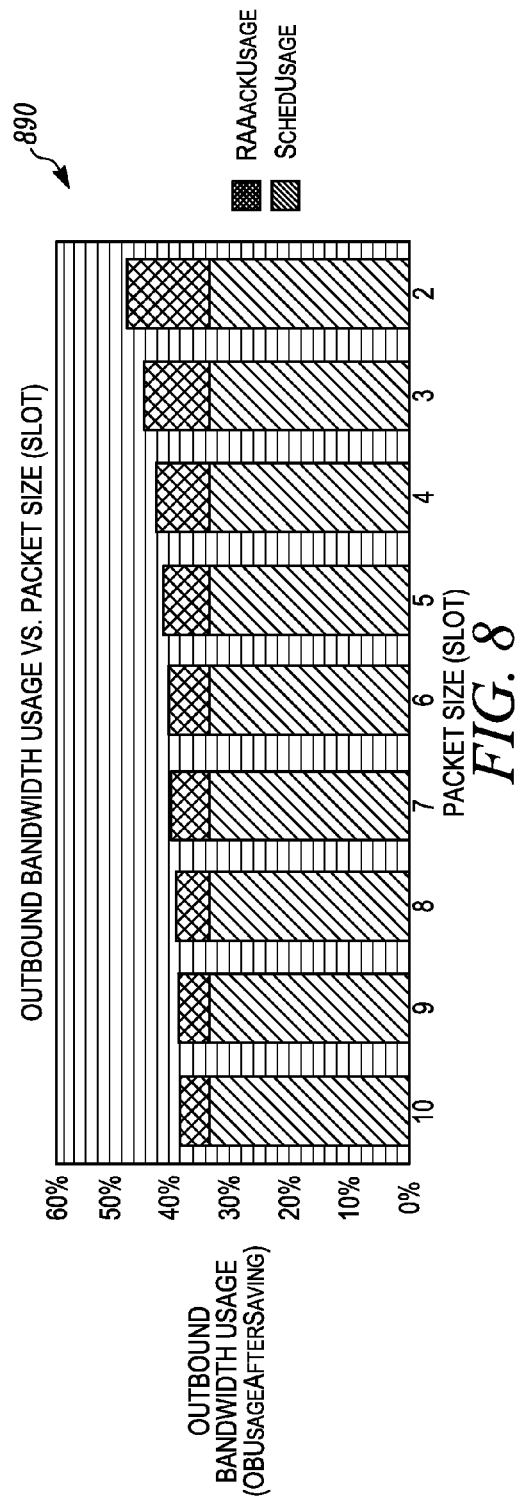
FIG. 8 shows a table and a graph illustrating an amount of outbound bandwidth usage that can be saved by the use of positional acknowledgment indicators in accordance with an embodiment of the present disclosure.

Embodiments of the present disclosure discussed herein may be applied to wireless communication systems that implement slotted channel architecture. In particular, embodiments of the present disclosure describe the use of positional acknowledgment indicators to provide acknowledgments to subscribers in order to eliminate the need for explicit acknowledgments, thereby saving the outbound bandwidth which is otherwise used for sending explicit acknowledgments to subscribers. FIG. 8 shows a table 800 illustrating an amount of outbound bandwidth usage that can be saved by the use of the positional acknowledgment indicators in accordance with embodiments of the present disclosure as compared to the use of explicit acknowledgments. In existing systems implementing explicit acknowledgments, the outbound bandwidth usage (OBUsage 810) is the sum of bandwidth used (RSAckUsage 820) for sending explicit acknowledgments, bandwidth used (SchedUsage 830) for sending scheduling information, and bandwidth used (RAAckUsage 840) for sending acknowledgments in response to a data request (RA-Request). In contrast, in systems using the positional acknowledgment indicators in accordance with the embodiments of the present disclosure, the outbound bandwidth usage (OBUsageAfterSaving 850) is the sum of bandwidth used (SchedUsage 830) for sending scheduling information, and bandwidth used (RAAckUsage 840) for sending acknowledgments to data request (RA-Request). For example, as shown in the table 800 in FIG. 8, for a packet size (PktSize 860) equal to ten (10) slot positions and with a number of users (Users 870) equal to two hundred and twenty (220), the outbound bandwidth usage (OBUsage 810) in systems implementing explicit acknowledgments is 55.62% as compared to the outbound usage (OBUsageAfterSaving 850) of 38.26% in systems implementing positional acknowledgment indicators. Thus, the amount of outbound bandwidth saved (% saved 880) in systems implementing a positional acknowledgment indicator in accordance with the present disclosure is 31.21%. A graph 890 is also provided in FIG. 8 that further illustrates a comparison of the outbound bandwidth usage for different packet sizes in communication systems that implement the use of positional acknowledgment indicators in accordance with embodiments of the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a base station to provide acknowledgment information for radio communication devices in a time division multiple access (TDMA) wireless communication system, the method comprising:

receiving a plurality of units of data, each unit of data respectively transmitted by one of a plurality of radio communication devices on one of a plurality of predetermined communication TDMA slot positions of a first channel;

generating a control message to include acknowledgment information having a plurality of time-division positional acknowledgment indicators and an acknowledgment position mapping information, wherein each time-division positional acknowledgment indicator respectively indicates an acknowledgment corresponding to the unit of data transmitted on a respective one of the plurality of predetermined communication TDMA slot positions of the first channel, and wherein the acknowledgment position mapping information maps a position of each time-division positional acknowledgment indicator to a position of each predetermined communication TDMA slot position within the plurality of predetermined communication TDMA slot positions of the first channel; and transmitting the control message including the acknowledgment information having the plurality of time-division positional acknowledgment indicators on one communication TDMA slot position of a second channel;

wherein the control message further includes scheduling information for scheduling new transmissions or retransmissions from one or more radio communication devices on future TDMA slot positions of the first channel;

wherein the scheduling information schedules "n" number of future communication TDMA slot positions on the first channel; and wherein the time-division positional acknowledgment indicators indicates an acknowledgment of an integer multiple of "n" number of past communication TDMA slot positions on the first channel.

2. The method of claim 1, wherein each radio communication device after transmitting its one or more units of data respectively on one or more of the predetermined communication TDMA slot positions of the first channel, switches to the second channel to receive the control message including the acknowledgment information and the acknowledgment position mapping information on the one communication TDMA slot position of the second channel.

3. The method of claim 1, wherein each radio communication device uses the acknowledgment position mapping information to identify one or more positions within the plurality of time-division positional acknowledgment indicators that contains an acknowledgment indicating whether or not the one or more units of data transmitted respectively on one or more of the plurality of predetermined communication TDMA slot positions were successfully received.

4. The method of claim 1, wherein generating the control message further comprises representing each time-division positional acknowledgment indicator within the acknowledgment information by one bit of data to acknowledge whether or not the unit of data transmitted on a respective one of the plurality of predetermined communication TDMA slot positions was successfully received.

5. The method of claim 1, wherein the acknowledgment information does not contain information other than the plurality of time-division positional acknowledgment indicators and the acknowledgement position mapping information.

6. The method of claim 1, wherein the acknowledgment information does not contain a unique identifier for any of the plurality of radio communication devices that maps one or more time-division positional acknowledgment indicators to a particular radio communication device.

7. A method of operating a radio communication device to recover acknowledgment information in a time division multiple access (TDMA) wireless communication system, the method comprising:

transmitting one or more units of data respectively on one or more of a plurality of predetermined communication TDMA slot positions of a first channel;

switching to a second channel and identifying one communication TDMA slot position of the second channel to receive a control message including acknowledgment information having a plurality of time-division positional acknowledgment indicators and an acknowledgment position mapping information, each time-division positional acknowledgment indicator respectively indicating an acknowledgment corresponding to each of the one or more units of data transmitted on respective ones of the plurality of predetermined communication TDMA slot positions of the first channel;

using the acknowledgment position mapping information to identify one or more positions within the plurality of time-division positional acknowledgment indicators, wherein the acknowledgment position mapping information maps a position of each time-division positional acknowledgment indicators within the acknowledgment information to a position of each predetermined communication TDMA slot position within the plurality of predetermined communication TDMA slot positions; and determining, from one or more time-division positional acknowledgment indicators corresponding to the identified one or more positions, an acknowledgment indicating whether or not the one or more units of data transmitted respectively on one or more of the plurality of predetermined communication TDMA slot positions were successfully received;

wherein the control message further includes scheduling information for scheduling new transmissions or retransmissions from one or more radio communication devices on future TDMA slot positions on the first channel;

wherein the scheduling information schedules "n" number of future communication TDMA slot positions on the first channel; and wherein the time-division positional acknowledgment indicators indicates an acknowledgment of an integer multiple of "n" number of past communication TDMA slot positions on the first channel.

8. The method of claim 7, wherein each time-division positional acknowledgment indicator within the acknowledgment information is respectively represented by one bit of data to acknowledge whether or not the unit of data transmitted on a respective one of the plurality of predetermined communication TDMA slot positions of the first channel was successfully received.

9. The method of claim 7, wherein the acknowledgment information does not contain information other than the plurality of time-division positional acknowledgment indicators and the acknowledgement position mapping information.

10. The method of claim 7, wherein the acknowledgment information does not contain a unique identifier of the radio communication device that maps one or more time-division positional acknowledgment indicators to the radio communication device.

11. The method of claim 7, further comprising configuring the radio communication device to monitor communication TDMA slot positions of the second channel to receive the control message that includes the acknowledgment information.

12. The method of claim 7, further comprising periodically receiving the acknowledgment information having a plurality of time-division positional acknowledgment indicators on one communication TDMA slot position of the second channel a predetermined number of times.

13. An apparatus for providing acknowledgment information for radio communication devices in a time division multiple access (TDMA) wireless communication system, the apparatus comprising:

a wireless transceiver configured to simultaneously operate on a first channel and a second channel, wherein the wireless transceiver operates on the first channel to receive a plurality of units of data, each unit of data respectively transmitted by one of a plurality of radio communication devices on one of a plurality of predetermined communication TDMA slot positions of the first channel; and a processor coupled to the wireless transceiver and configured to:

generate a control message to include acknowledgment information having a plurality of time-division positional acknowledgment indicators and an acknowledgment position mapping information, wherein each acknowledgment indicator respectively indicates an acknowledgment corresponding to the unit of data transmitted on a respective one of the plurality of predetermined communication TDMA slot positions of the first channel, and wherein the acknowledgment position mapping information maps a position of each time-division positional acknowledgment indicator to a position of each predetermined communication TDMA slot position within the plurality of predetermined communication TDMA slot positions of the first channel; and cause the wireless transceiver to transmit the control message including the acknowledgment information having the plurality of time-division positional acknowledgment indicators on one communication TDMA slot position of the second channel, and wherein the control message further includes scheduling information for scheduling new transmission or retransmissions from one or more radio communication devices on future TDMA slot positions on the first channel;

wherein the scheduling information schedules "n" number of future communication TDMA slot positions on the first channel; and wherein the time-division positional acknowledgment indicators indicates an acknowledgment of an integer multiple of "n" number of past communication TDMA slot positions on the first channel.

* * * * *